United States Patent [19]
Clyde et al.

[11] Patent Number: 5,286,947
[45] Date of Patent: Feb. 15, 1994

[54] APPARATUS AND METHOD FOR MONITORING MATERIAL REMOVAL FROM A WORKPIECE

[75] Inventors: Diana R. C. Clyde, West Chester; Ralph M. Somers, Cincinnati; Jerry H. Carmichael, West Chester, all of Ohio

[73] Assignee: General Electric Company, Cincinnati, Ohio

[21] Appl. No.: 941,625

[22] Filed: Sep. 8, 1992

[51] Int. Cl.$^5$ ............................................. B23K 26/02
[52] U.S. Cl. ........................... 219/121.83; 219/121.68; 219/121.69
[58] Field of Search ..................... 219/121.63, 121.64, 219/121.68, 121.69, 121.67, 121.72, 121.83

[56] References Cited

U.S. PATENT DOCUMENTS

| | | | |
|---|---|---|---|
| 3,700,850 | 10/1972 | Lumley et al. | 219/121 LM |
| 3,962,558 | 6/1976 | Kocher et al. | 219/121 LM |
| 4,114,018 | 9/1978 | Von Allmen et al. | 219/121 LM |
| 4,608,480 | 8/1986 | Bizot et al. | 219/121 LK |
| 4,873,414 | 10/1989 | Ma et al. | 219/121.7 |
| 4,960,970 | 10/1990 | Schneiter | 219/121.6 |
| 5,013,886 | 5/1991 | Koegl et al. | 219/121.83 |
| 5,026,964 | 6/1991 | Somers et al. | 219/121.7 |
| 5,026,979 | 6/1991 | Ortiz, Jr. et al. | 250/205 |
| 5,045,669 | 9/1991 | Ortiz, Jr. et al. | 219/121.83 |
| 5,059,761 | 10/1991 | Koegl et al. | 219/121.83 |
| 4,865,683 | 9/1989 | Burns | 156/627 |

*Primary Examiner*—C. L. Albritton
*Attorney, Agent, or Firm*—Charles L. Moore, Jr.; Jerome C. Squillaro

[57] ABSTRACT

An apparatus and method for monitoring material removal from a workpiece by a beam of energy during a material processing operation are disclosed. A detector is positioned for sensing optical emissions from the workpiece caused by removal of material when an energy beam pulse is incident upon the surface of the workpiece. A computing circuit, algorithm or artificial neural network is provided for determining a quantity of material removed from the sensed optical emissions in real-time during the material processing operation. Analysis of the optical emission pulses caused by the material removal provides an indication of the efficiency of the material processing system and provides feedback for manual or automatic adjustment of material processing parameters during the material processing operation.

31 Claims, 3 Drawing Sheets

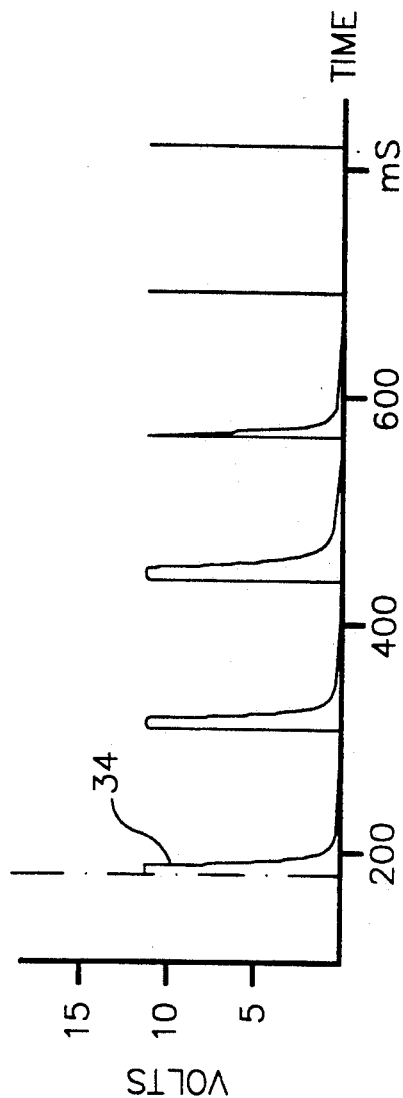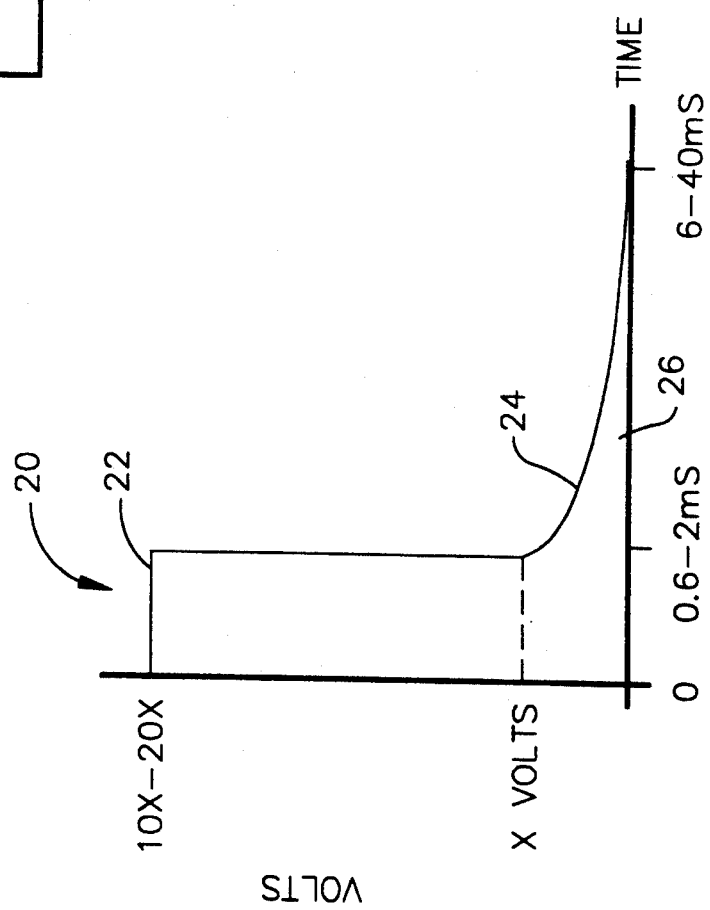
FIG. 3
FIG. 2

APPARATUS AND METHOD FOR MONITORING MATERIAL REMOVAL FROM A WORKPIECE

RELATED PATENTS

The present application is related to the following commonly assigned patents:

U.S. Pat. No. 5,026,964, entitled "Optical Breakthrough Sensor for Laser Drill", issued Jun. 25, 1991.

U.S. Pat. No. 5,026,979, entitled "Method and Apparatus for Optically Monitoring Laser Materials Processing", issued Jun. 25, 1991.

U.S. Pat. No. 5,045,669, entitled "Method and Apparatus for Optically/Acoustically Monitoring Laser Materials Processing", issued Sep. 3, 1991.

These patents are incorporated herein by reference in their entirety.

BACKGROUND OF THE INVENTION

The present invention relates to material processing using a beam of energy, such as a laser beam, an electron beam, a plasma arc or the like, and more particularly, to an apparatus and method for monitoring and controlling material removal from a workpiece by an energy beam, in real-time, during a material processing operation.

Material processing using a beam of energy, particularly a laser beam, is gaining wider application and use in manufacturing, such as the manufacturing of gas turbine engine components and the like, because of the speed, efficiency and ease of incorporation of a laser in an automated system.

Laser material processing may include a variety of processes performed on a workpiece, such as cutting, welding, drilling or the like, using a continuous wave or a pulsed laser beam. The average energy density of such a laser beam may range from as little as fractions of a joule/cm$^2$ to as much as thousands of joules/cm$^2$, the specific energy being dependent upon the particular process being performed and the type of material being processed.

Gas turbine engine components, particularly those used in high performance engines for aircraft propulsion, sometimes require the formation of extremely small diameter holes such as the cooling holes in a turbine blade. Holes of this type are sometimes referred to as "through holes" because the cooling holes extend completely through the surface of the turbine blade and form a channel to an interior plenum of the blade to permit cooling air streams to escape from the interior plenum and to flow over the exterior of the blade for blade cooling during engine operation. These cooling holes are typically formed by drilling using a pulsed laser beam. The laser beam pulse preferably has sufficient energy density to cause intense local heating of the workpiece when incident thereon. The intense local heating causes very hot minute particles of material to be expelled from the localized drilling area. The heated minute particles, in the form of a plume of sparks, radiate heat and light (optical emissions).

Current devices and methods for determining the amount of material removed during a laser material processing operation include checking the hole diameters with pin gauges after the material processing operation or performing air flow tests also after the operation to determine if a sufficient volume of air is passing through the blade cooling holes to provide adequate cooling of the component during engine operation. Both of these procedures are performed after the material processing operation and do not provide real-time monitoring of the quantity of material removed while the material processing operation is being performed to permit in-process adjustment of process parameters to improve efficiency or to correct processing errors. Additionally, the airflow procedure is not applicable for determining the amount of material removed from cavities or non-through holes, and depending upon the number of holes to be formed, it may not be practical or possible to pin gauge every through or non-through hole. As a practical matter, only a random sample of holes are generally pin gauged.

The above-referenced patents disclose devices and methods for detecting when the laser beam has completely drilled through the material to form a through hole so that the laser beam pulses can be stopped before damage may result to the interior of the component. The devices disclosed in these patents provide no information as to the quantity of material removed by each laser beam pulse or the cumulative amount of material removed by a series of pulses. The devices disclosed in these patents also do not provide analysis of the spark plumes or optical emission pulses for real-time in process monitoring of laser health or efficiency of the material processing operation, such as how well the laser beam is coupling into the material and removing material from the workpiece. Additionally, the devices disclosed provide no indication of the size or depth of through and non-through holes, cavities or other features being formed in the surface of a workpiece by a laser beam during the processing.

Another device for use in laser material processing is disclosed in U.S. Pat. No. 4,865,683, entitled "Method and Apparatus for Laser Process Control" by Burns, issued Sep. 12, 1989. This patent discloses a method and apparatus for controlling the energy of a laser beam incident upon a workpiece using a photodetector for generating an electrical signal which is proportional to the light reflected from the workpiece. The energy of the laser beam incident upon the workpiece is increased from some predetermined low level until the photodetector senses an abrupt change in the reflected light. This change represents a changed state in the workpiece material (from amorphous silicon to crystalline silicon), and this energy level is used as a reference level for further laser processing. This device also does not provide any information as to the quantity of material removed from the workpiece during the material processing operation.

SUMMARY OF THE INVENTION

It is, accordingly, a primary object of the present invention to provide a novel method and apparatus for monitoring material removal from a workpiece by a beam of energy during a material processing operation which is not subject to the foregoing disadvantages.

It is another object of the present invention to provide a novel method and apparatus for real-time monitoring material removal which provides an indication of the quantity of material removed by analyzing the spark or plume caused by an incident energy beam.

It is a further object of the present invention to provide a method and apparatus for determining the quantity of material removed from a workpiece during a material processing operation to permit in-process control of the material processing parameters during the operation.

In accordance with the present invention, an apparatus for monitoring material removal from a workpiece by a beam of energy during a material processing operation includes a detector for sensing optical emissions from the workpiece caused by removal of material when the energy beam is incident upon the workpiece. A computing means is provided for determining a quantity of material removed from the workpiece by analyzing the sensed optical emissions in real-time during the material processing operation and a controller may be provided to adjust the material processing parameters in response to the quantity of material removed. The computing means calculates a numerical average of an amplitude of a signal representative of the sensed optical emissions or the pulse duration of a sensed optical emission pulse. The numerical average or the emission pulse duration will be proportional to the quantity of material removed for a selected set of material processing parameters.

The method of the present invention for monitoring and controlling material removal from a workpiece by a beam of energy during a material processing operation includes the steps of: detecting optical emissions from the workpiece caused by removal of material; determining a quantity of material removed from the detected optical emissions during the material processing operation; and controlling the material processing operation in response to the quantity of material removed.

These and other objects of the present invention, together with the features and advantages thereof, will become apparent from the following specification when read with the accompanying drawings.

BRIEF DESCRIPTION OF THE DRAWINGS

FIG. 2 is an example of an electrical signal representative of a sensed optical emission from the surface of a workpiece caused by removal of material when a laser beam pulse is incident upon the surface.

FIG. 3 is an example of a series of discrete electrical signals or pulses each representative of a sensed optical emission from the surface of a workpiece caused by removal of material when each of a series of discrete laser pulses strikes the surface.

DETAILED DESCRIPTION OF THE PREFERRED EMBODIMENTS

Figure 1:
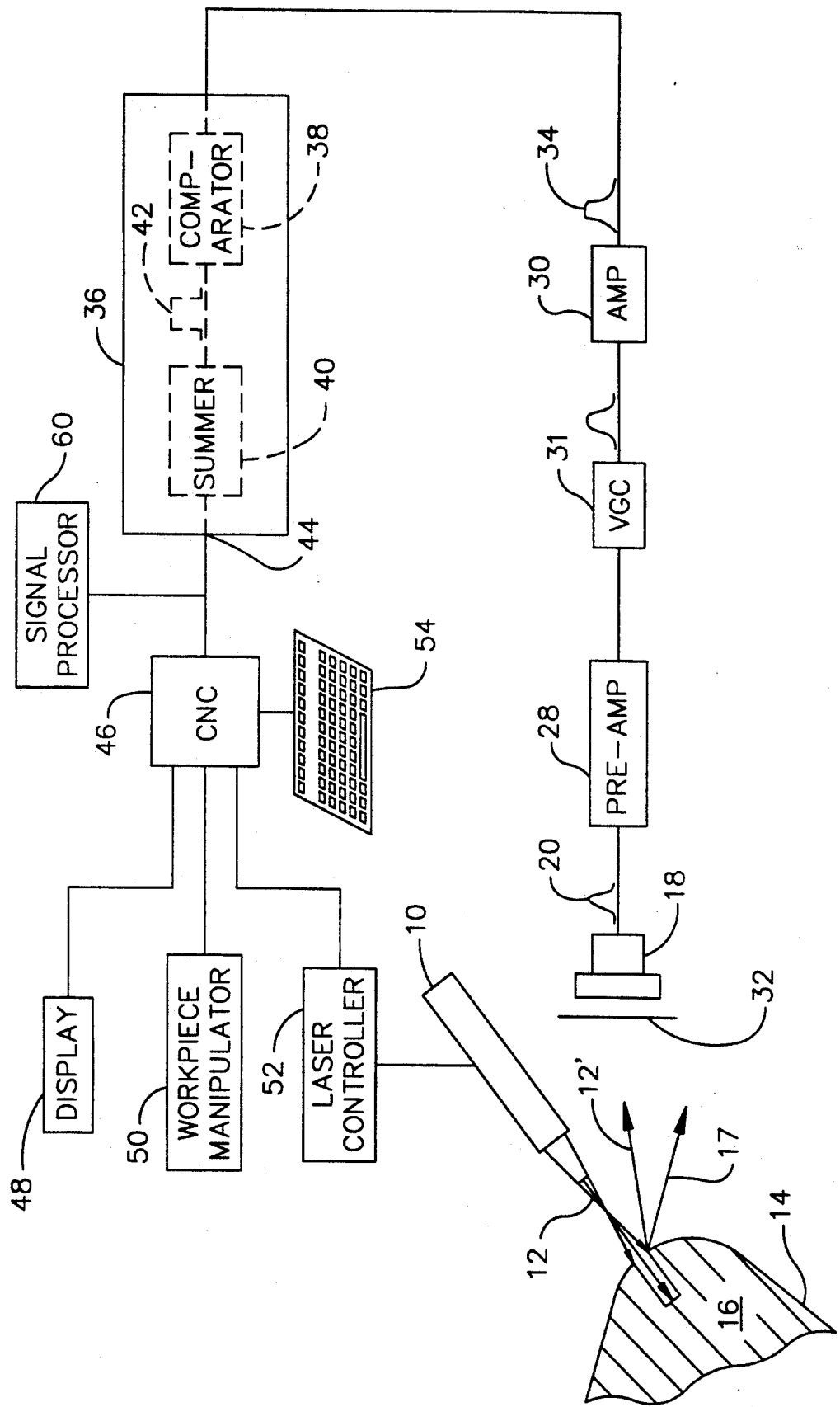
FIG. 1 is a schematic diagram of an apparatus for use in material processing in accordance with the present invention.

Referring initially to FIG. 1, a device for use in material processing, i.e., cutting, welding, drilling or the like includes a source 10 for generating a beam 12 of energy, such as a laser beam, electron beam, plasma arc or the like. For purposes of explanation, the energy beam 12 will be referred to hereinafter as a laser beam. The laser beam 12 may be a continuous wave type beam but for purposes of the present invention, a pulsed laser beam 12 may be preferred. Depending upon the type of material being processed, the laser beam 12 should have sufficient energy density to cause intense local heating and removal of very hot minute particles from a surface 14 of a workpiece 16. These heated minute particles form a plume of sparks or optical emissions represented by arrow 17 in FIG. 1.

In accordance with the present invention, a detector 18 senses the optical emissions 17 from the workpiece 16 caused by the removal of the hot minute particles and generates an electrical signal 20 representative of the sensed optical emissions 17. Detector 18 may be a photodetector, infrared radiometer, camera or similar device capable of sensing the optical emissions 17 and generating a signal representative of the intensity of the optical emissions 17 and the duration thereof. An example of a typical electrical signal or emission pulse 20 generated from an incident laser beam pulse is shown in FIG. 2. The electrical signal 20 contains two portions, a first portion 22 having a large amplitude and a short duration and a second portion 24 characterized by an exponentially decaying "tail" section. The first portion of the electrical signal represents the laser beam 12' reflected from the workpiece surface 14 and has an amplitude about 10 to about 20 times that of the exponentially decaying portion 24. The pulse width of the reflected laser beam portion 22 of the electrical signal 20 may be about 0.6 to about 2.0 milliseconds. The area 26 under the tail portion 24 of the electrical signal 20 contains most of the information regarding material removal from workpiece 16. This portion of the signal represents the emission from the expelled or removed hot minute particles and the plasma formed at the surface 14 of the workpiece 16.

In order to evaluate or analyze the emission portion 24 of the electrical signal 20, one or more amplification stages may be provided. A pre-amplifier 28 and an amplifier 30 are shown. As described in more detail hereinafter, a variable gain circuit (VGC) 31 may be connected to the output of pre-amplifier 28 to prevent or minimize overdriving the amplifier 30; although, alternative devices may be used aswell. Pre-amplifier 28 and amplifier 30 may be a general class of inverting amplifiers based on operational amplifiers with feedback, such as an LM 324 as manufactured by the National Semiconductor Corporation.

The amplifier stages 28 and 30 may be temporarily overloaded or saturated by the large amplitude first portion 22 of the electrical signal 20. The effects of this saturation can be reduced by selecting wide bandwidth operational amplifiers for amplifier stages 28 and 30, or by selecting the smallest practical values for feedback capacitors in association with the operational amplifiers 28 and 30. The variable gain circuit 31 may also be used or used alternatively so that the smaller amplitude material removal portion 24 of the electrical signal 20 is amplified more than the larger amplitude first portion 22.

In another embodiment of the present invention, a logarithmic amplifier may be connected in place of VGC 31 to compress the electrical signal 20 at the input to amplifier 30 to minimize the overload condition.

In a further embodiment of the present invention, a spectral filter 32 may be positioned in an optical path between the workpiece surface 14 and the detector 18 to filter out the reflected laser beam 12' and to only pass the wavelength of emitted energy which will correspond to the expelled or removed particles and thereby eliminate overdriving or saturation of the amplifier stages 28 and 30.

In accordance with the present invention, the output of the last amplifier stage 30 is connected to a computing means 36 for computing a real-time numerical average of an amplitude of the output or processed emission pulse or signal 34. The numerical average will be directly proportional to the quantity of material removed by the laser beam pulse 12. In one embodiment of the present invention, the computing means 36 may be an analog integration circuit, such as an operational amplifier integrator, which is known to those skilled in the art, to determine the area under the electrical signal 20 and to divide that area by the pulse width of the signal to provide the numerical average during the material processing operation.

In another embodiment of the present invention, the computing means 36 may be a digital computer having an integration algorithm, such as a trapezoidal rule algorithm or the like, stored therein for computing the numerical average, or, in a further embodiment of the present invention, the computing means 36 may include a comparator 38, such as an LM 339 as manufactured by the National Semiconductor Corporation, and a summer circuit 40, such as a six digit component counter SUBCUB II TM, as manufactured by Red Lion Controls of York, Pa. This later embodiment may not provide the computing accuracy of the integration circuit or the digital computer but would be less expensive to implement.

The comparator 38 receives the output or processed emission signal 34 from amplifier 30 and converts the processed signal 34 from an analog signal to a digital signal having a pulse width substantially equal to a pulse width of that portion of the processed emission signal 34 which exceeds a predetermined reference signal. The summer 40 receives the digital output signal 42 from comparator 38 and adds the pulse width of this signal to any previously received digital signals generated by optical emissions caused by previous laser beam pulses 12. The duration or pulse width of each digital signal 42 will be directly proportional to the quantity of material removed and the sum of the pulse widths of all digital signals received will provide a real-time indication of the total quantity of material removed or the depth of the hole being drilled during the material processing operation.

In accordance with a further embodiment of the present invention, computing means 36 may be an artificial neural network (ANN) of the back-propagation type, such as the BRAIN CELL TM, manufactured by Promised Land Technologies, Inc., New Haven, Conn., the ANZAPLUS TM, manufactured by Hecht-Nielsen Neuro Computer Corporation of San Diego, Calif., or the like, to provide algorithmic control of the material processing operation. The ANN is an artificial intelligence network which can be trained or programmed to provide a desired output signal in response to one or more input signals of a known or expected characteristic. In other words, the artificial neural network represents a transfer function which provides a desired output in response to input signals having expected characteristics. In accordance with the present invention, the ANN can provide an output which represents the real-time amount of material removed on the basis of the input signal 34 or may provide an output which corresponds substantially to the nominal size or diameter of a channel or cavity being formed in the surface 14 of workpiece 16 in real-time during the process or the size of the channel formed immediately after the process without the need for external devices, such as pin gauges or airflow meters.

In an automated system, the output 44 of the neural network or computing means 36 is preferably connected to a controller 46, such as a computer numerical controller, which controls movement of the workpiece, laser or both, and the laser material processing parameters, such as energy density, optical alignment of the laser and workpiece or drilling angle, focus of the laser, laser pulse duration and coupling efficiency of the laser beam 12. The computing means 36 may be a discrete component or may be integrated as part of the controller 46. The controller 46 may be coupled to a display 48 for providing a pulse width of the optical emission pulse 20, the cumulative sum of a series of emission pulses generated by a series of incident laser beam pulses and an indication of the depth, diameter or size of the passage or cavity being formed in the workpiece surface 14.

The controller 46 may also be connected to a workpiece manipulator 50 and a laser controller 52 to permit real-time control of the laser material processing parameters and alignment of the workpiece and incident laser beam during a material processing operation. The controller 46 may also be interconnected to a keyboard 54 to provide an operator interface for adjustment of the material processing parameters. The output of computing means 36 may also be used to automatically control the material processing operation according to preset reference parameter values stored in the controller 46 to provide automatic control of the laser material processing operation with minimal operator intervention.

Referring now to FIG. 3, a series of processed emission pulses 34 taken at the output of amplifier 30 are shown resulting from six laser beam pulses 12 incident upon a test plate (not shown) having a thickness of about 0.065" at an included angle of incidence of about 25° relative to the plane of the surface of the test plate. The resulting path length through the test plate was about 0.154" (path length = 0.065"/sin 25°).

Figure 4:
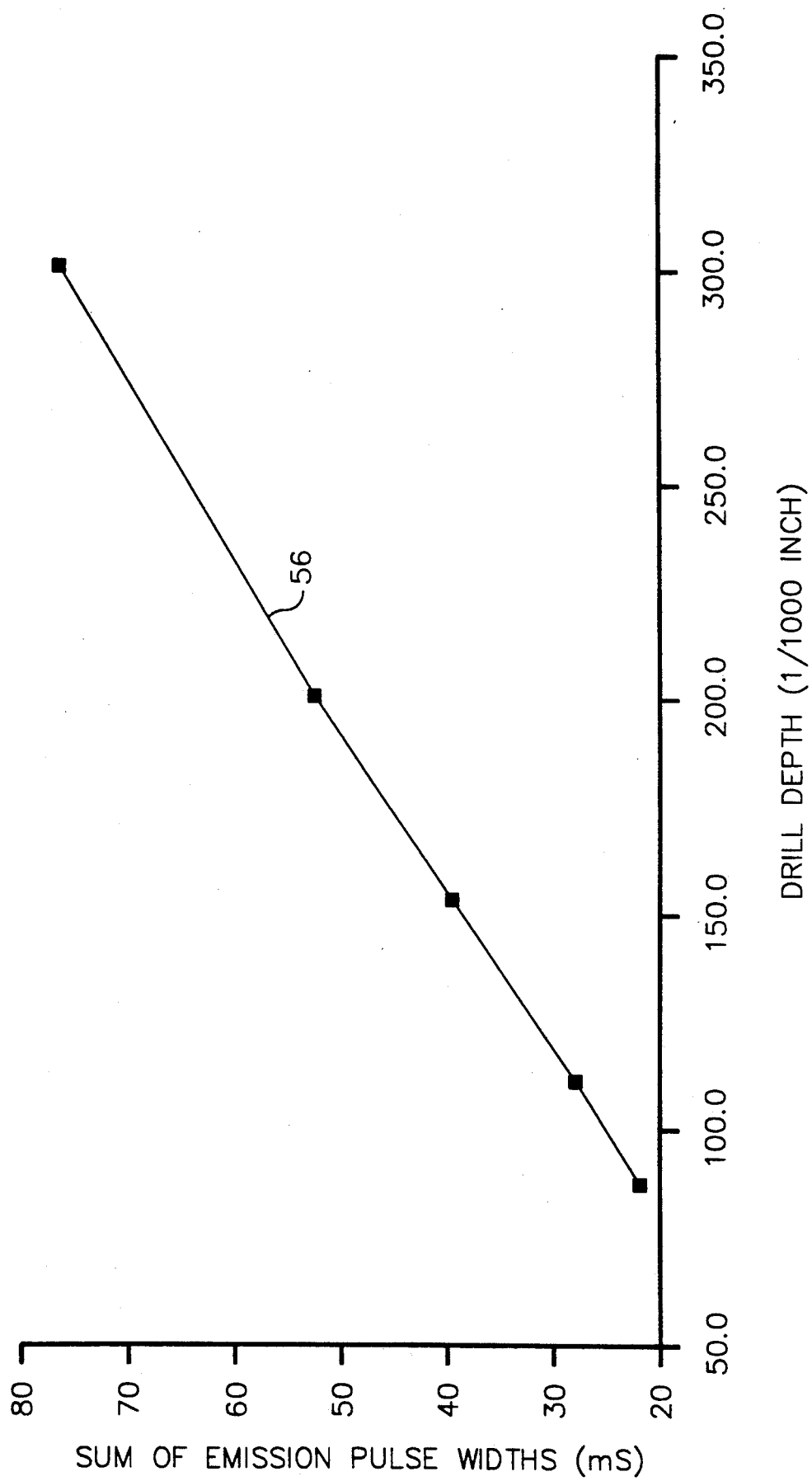
FIG. 4 is an example of a graph of the cumulative emission pulse widths versus drill depth in the surface of a workpiece.

FIG. 4 is a graph of the cumulative sum of the pulse widths of the individual processed emission pulses 34 of FIG. 3 plotted against distance drilled through the test plate. As indicated by the graph 56, the relationship between the sum of the pulse widths and the distance drilled through the test plate is substantially linear and the amount of material removed can be seen to be substantially directly proportional to the duration of the processed optical emission pulses 34 and the optical emissions 17 received by the detector 18 from which the processed pulses 34 are derived. From characteristic curves similar to that shown in FIG. 4 for different materials and material processing parameters, the amount of material removed may be predicted from the duration of the emission pulse 20 and the total material removed may be predicted from the cumulative sum of the emission pulse widths sensed by detector 18. Such characteristic curves may be stored by computing means 36.

In accordance with the present invention, the waveform of the emission pulse 20 or the processed emission pulse 34 may be analyzed to further evaluate the material processing operation and to permit realtime control of the process. The signal waveform may be expanded or enhanced by a microprocessor based signal processor 60 to permit detailed analysis of the signal waveform characteristics, such as the rise time, peak value, fall time, pulse duration and the like. Such information may be used to further control the material processing operation by adjusting the process parameters in response to the waveform characteristics. The emission signal or pulse 34 may also be compared to a reference or baseline signal generated from a known or controlled process and stored in the computer means 36 or in another external computer (not shown) which may be provided for more computing capacity and storage of historical and statistical data. If the emission pulse 34 deviates from the reference pulse by a predetermined amount when the two pulses are compared, the external computer in conjunction with the CNC 46 can directly control the drilling process by altering the process parameters, such as the laser pump voltage, energy beam focus, angle of incidence of the energy beam and the like.

It will be readily understood by those skilled in the art that the present invention is not limited to the specific embodiments described and illustrated herein. Different embodiments and adaptations besides those shown herein and described as well as many variations, modifications and equivalent arrangements will now be apparent or will be reasonably suggested by the foregoing specification and drawings, without departing from the substance or scope of the invention. While the present invention has been described herein in detail in relation to its preferred embodiments, it is to be understood that this disclosure is only illustrative and exemplary of the present invention and is made merely for purposes of providing a full and enabling disclosure of the invention. Accordingly, it is intended that the invention be limited only by the spirit and scope of the claims appended hereto.

What is claimed is:

1. An apparatus for monitoring material removal from a workpiece by a beam of energy during a material processing operation, comprising:
    a detector for sensing optical emissions caused by removal of material from the workpiece; and
    means for determining in real-time a quantity of material removed from said sensed optical emissions during the material processing operation.

2. The apparatus of claim 1, further comprising means for controlling said material processing operation in response to said quantity of material removed.

3. The apparatus of claim 2, wherein said detector generates an electrical signal representative of said sensed optical emissions and the apparatus further comprises means for amplifying and conditioning said electrical signal to provide a processed signal.

4. The apparatus of claim 3, wherein said quantity determining means comprises means for computing a numerical average of an amplitude of said processed signal, said numerical average being proportional to said quantity of material removed.

5. The apparatus of claim 4, wherein said computing means comprises an analog integration circuit.

6. The apparatus of claim 4, wherein said computing means comprises an integration algorithm.

7. The apparatus of claim 3, wherein said first portion of said electrical signal has a substantially larger amplitude than said tail portion, and said amplifying and conditioning means comprises at least one amplifier stage to amplify said electrical signal tail portion.

8. The apparatus of claim 7, further comprising means for limiting amplification of said electrical signal first portion to ameliorate saturation of the at least one amplifier stage.

9. The apparatus of claim 2, wherein said controlling means further comprises means for adjusting at least one of a set of material processing parameters during the material processing operation.

10. The apparatus of claim 9, wherein said set of material processing parameters includes energy density of the beam, alignment of the workpiece and the energy beam, beam spot size, beam focus and angle of incidence of the beam.

11. The apparatus of claim 1, wherein said quantity determining means comprises an artificial neural network to provide an output representative of the quantity of material removed from the workpiece.

12. The apparatus of claim 11, wherein said output of said artificial neural network is a size of a passage being formed in the workpiece by the energy beam.

13. The apparatus of claim 1, wherein said energy beam is one of a laser beam, an electron beam and a plasma arc.

14. The apparatus of claim 1, wherein said detector generates an electrical emission pulse signal representative of said sensed optical emissions and said quantity determining means determines the quantity of material removed by analyzing the duration of said emission pulse signal.

15. The apparatus of claim 14, wherein said quantity determining means comprises:
    a comparator having an input for receiving said emission pulse signal, said comparator converting said emission pulse signal from an analog signal to a digital signal; and
    a summer for receiving said digital signal and adding a pulse width of said signal to a pulse width of any previously received digital signals.

16. An apparatus for use in material processing, comprising:
    a source for generating a pulsed energy beam having a predetermined energy density to cause removal of material from a workpiece;
    means for directing said pulsed energy beam on a selected location of the workpiece to remove material therefrom;
    a detector for sensing optical emissions caused by removal of material from the workpiece; and
    means for determining a quantity of material removed from said sensed optical emissions during a material processing operation.

17. The apparatus of claim 16, wherein said detector generates an electrical signal representative of said sensed optical emissions and the apparatus further comprises means for amplifying and conditioning said electrical signal to provide a processed signal.

18. The apparatus of claim 17, wherein said quantity determining means comprises means for computing a numerical average of an amplitude of said processed signal, said numerical average being proportional to said quantity of material removed.

19. The apparatus of claim 16, wherein said quantity determining means comprises an artificial neural network to provide an output representative of the quantity of material removed from the workpiece.

20. The apparatus of claim 16, further comprising means for controlling said material processing operation in response to said quantity of material removed.

21. An apparatus for monitoring material removal from a workpiece by a beam of energy during a material processing operation, comprising:
    means for sensing optical emissions caused by removal of material from the workpiece and for generating an emission signal representative of the sensed optical emissions; and means for analyzing a waveform of said emission signal to control the material processing operation.

22. The apparatus of claim 21, wherein said analyzing means comprises signal processing means for expanding and enhancing said emission signal waveform for analysis of characteristics of said emission signal waveform, and said apparatus further comprising means for controlling said material processing in response to said waveform characteristics.

23. The apparatus of claim 21, wherein said analyzing means comprises means for comparing said emission signal to a reference signal, and said apparatus further comprising means for controlling said material processing in response to a deviation between said emission signal and said reference signal.

24. A method for controlling material removal from a workpiece by a beam of energy during a material processing operation, comprising the steps of:

detecting optical emissions caused by removal of material from the workpiece;

determining a quantity of material removed from the detected optical emissions during the material processing operation; and controlling the material processing operation in response to the quantity of material removed.

25. The method of claim 24, wherein said detecting step comprises the step of generating an electrical signal representative of said detected optical emissions.

26. The method of claim 25, further comprising the steps of amplifying and conditioning said electrical signal to provide a processed signal.

27. The method of claim 26, further comprising the step of computing a numerical average of an amplitude of said processed signal, said numerical average being proportional to said quantity of material removed.

28. The method of claim 26, wherein said quantity determining step comprises the steps of:

comparing said processed signal to a reference signal;

converting said processed signal to a digital signal if said processed signal exceeds said referenced signal; and analyzing the duration of said processed signal to determine the quantity of material removed.

29. A method for controlling material removal from a workpiece by a beam of energy during a material processing operation, comprising the steps of:

detecting optical emissions caused by removal of material from the workpiece;

generating an emission signal representative of the detected optical emissions during the material processing operation; and analyzing a waveform of the emission signal to control the material processing operation.

30. The method of claim 29, further comprising the step of controlling the material processing operation in response to characteristics of the waveform of the emission signal.

31. The method of claim 29, wherein the step of analyzing the waveform comprises the step of comparing the emission signal to a reference signal, and said method further comprising the step of controlling the material processing operation in response to any deviation between the emission signal and the reference signal.

* * * * *